J. H. GLASSBURN & W. C. EVANS.
HARROW.
APPLICATION FILED NOV. 10, 1910.
1,006,844.
Patented Oct. 24, 1911.
3 SHEETS—SHEET 3.
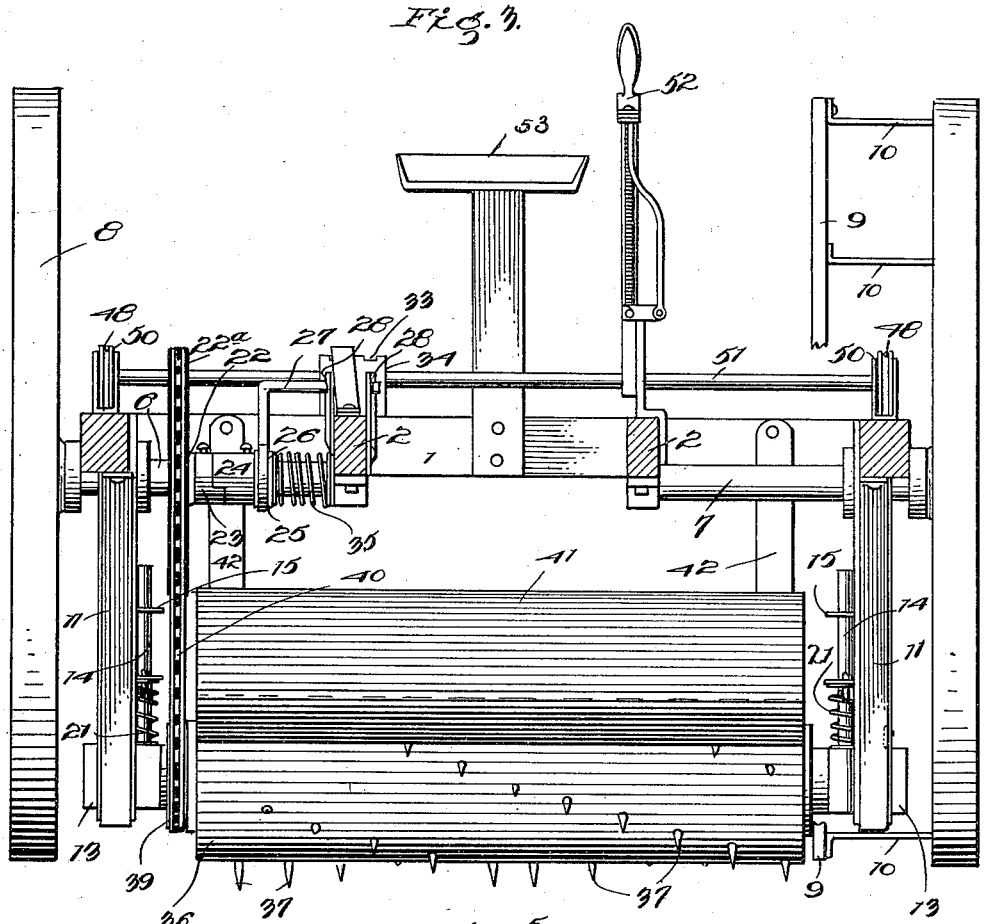
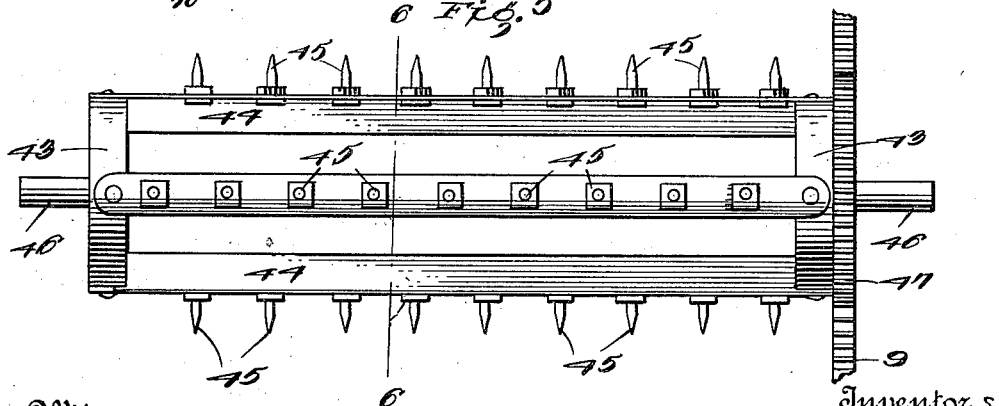
Witnesses
Inventors
John H. Glassburn
William C. Evans
By E. E. Vrooman, Attorney.

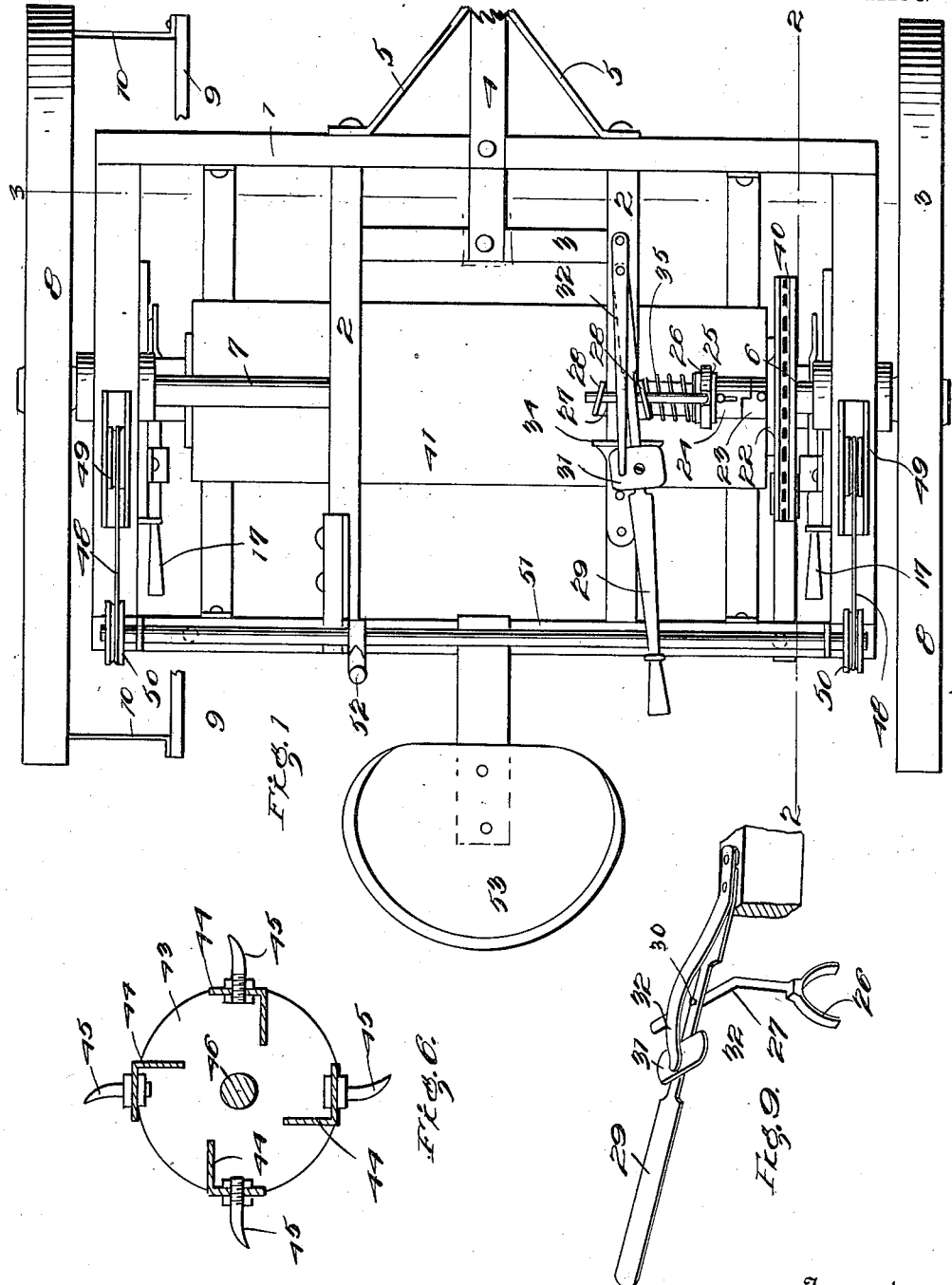

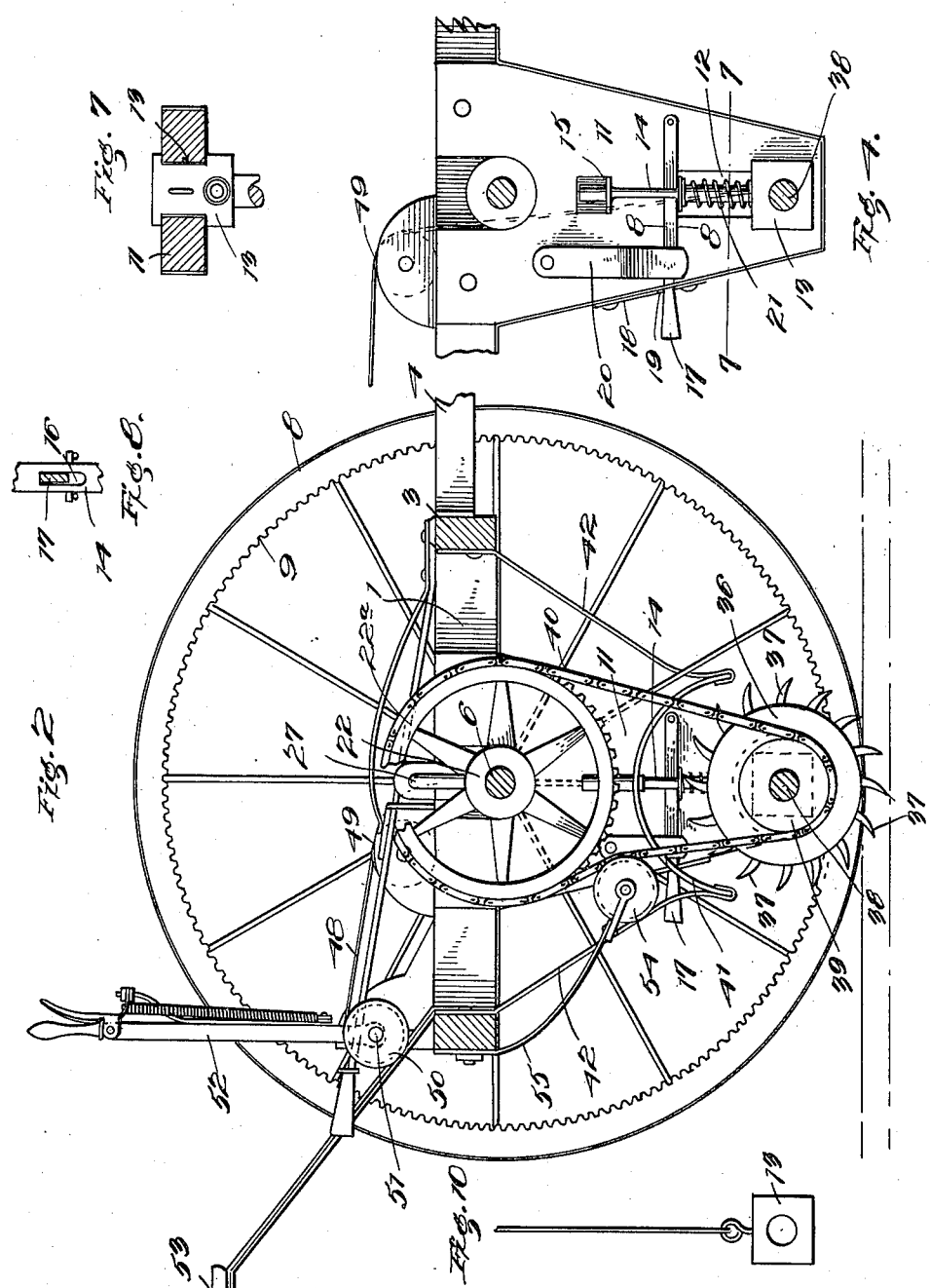

UNITED STATES PATENT OFFICE.

JOHN H. GLASSBURN AND WILLIAM C. EVANS, OF SEDALIA, MISSOURI, ASSIGNORS OF ONE-HALF TO WILLIAM C. EVANS AND ONE-HALF TO ROY CLEMENTS, BOTH OF SEDALIA, MISSOURI.

HARROW.

1,006,844.  Specification of Letters Patent.  Patented Oct. 24, 1911.

Application filed November 10, 1910. Serial No. 591,645.

*To all whom it may concern:*

Be it known that we, JOHN H. GLASSBURN and WILLIAM C. EVANS, citizens of the United States, residing at Sedalia, in the county of Pettis and State of Missouri, have invented certain new and useful Improvements in Harrows, of which the following is a specification, reference being had therein to the accompanying drawing.

This invention relates to rotary harrows, and the principal object of the same is to provide a strong and serviceable machine in which the pulverizing roller is yieldably mounted so that the shocks and jars incidental to use will be absorbed and in which novel means are employed for adjusting the roller relative to the ground and in which means are provided whereby the roller can be readily rendered inactive when desired.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a fragmentary top plan view of the improved harrow. Fig. 2 is a longitudinal sectional view taken on the line 2—2, Fig. 1. Fig. 3 is a transverse vertical sectional view taken on the line 3—3, Fig. 1. Fig. 4 is a detail view in side elevation of one of the hanger bearings of the harrow. Fig. 5 is a detail view of a pulverizing roller adapted for use on the harrow. Fig. 6 is a vertical sectional view taken on the line 6—6, Fig. 5. Fig. 7 is a horizontal sectional view taken on the line 7—7, Fig. 4. Fig. 8 is a fragmentary vertical sectional view taken on the line 8—8, Fig. 4. Fig. 9 is a detail perspective view of a clutch shifting mechanism. Fig. 10 is a detail view of one of the adjustable bearing boxes.

Referring to the accompanying drawings by numerals, it will be seen that the improved harrow comprises a frame 1 that is preferably rectangular in shape and which is spanned by the spaced parallel supporting beams 2. A bar 3 connects the forward ends of beams 2, said bar 3 and the forward member of the frame 1 support the tongue 4. Braces 5 project from said forward member and engage said tongue.

Axles project from the ends of the frame 1, said axles being designated by the numerals 6 and 7 and are journaled in suitable bearings carried by the ends of the said frame and the beams 2. Supporting wheels 8 are mounted on the axles 6 and 7, one of said wheels having an internally toothed gear ring 9 fastened to its inner face in spaced relation by the arms 10.

Hanger brackets 11 depend from the central portion of each end of frame 1, said brackets being provided with central vertical guide slots 12 in their lower portions. Bearing boxes 13 are slidable in said slots 12. Said boxes 13 have their inner ends equipped with vertical rods 14 that are slidable through guide plates 15 that project laterally from the inner faces of brackets 11. At an intermediate point, said rods are provided with longitudinal slots 16, through which the hand levers 17 that are pivoted to the brackets 11 project. Latching plates 18 are provided with notches 19 for the reception of levers 17. Leaf springs 20 normally retain said levers 17 in said notches 19. Springs 21 are coiled about the rods 14 between the hand levers 17 and the boxes 13. This manner of mounting the boxes 13 in the slots 12 permits the pulverizing cylinder (to be described) that is carried by said boxes to have a limited yielding movement so that shocks and jars incidental to striking obstructions will be absorbed.

Axle 6 has the hub 22 of a sprocket wheel 22ª loose thereon. Said hub is provided with a clutch face 23 adapted to be engaged by a clutch sleeve 24 that is slidable on axle 6 to lock the hub to said axle. Sleeve 24 is provided with a circumferential groove 25 that is engaged by the end fork 26 of a shifting lever 27 that is slidable in guides 28 carried by one of the beams 2. A hand lever 29 has one end pivotally connected to said beam 2, said lever having an intermediate pivotal connection 30 with the shifting lever 27. Hand lever 29 is provided with a plate 31 upon which one end of a leaf spring 32 bears to normally and selectively hold the said lever to the notches 33 of a plate 34 carried by said beam 2. Said notches 33 are arranged so that when the lever 29 is in one, the sleeve 24 will be locked to the hub 21, and when in the other notch, the said sleeve will be held disengaged from said hub. A spring 35 is constantly exerting a pressure tending to throw sleeve 24 into engagement with hub 21.

In this invention it is contemplated using various types of pulverizing rollers, examples of two of which are shown in the accompanying drawings. In Figs. 2 and 3, the roller 36 is solid and is provided with a plurality of longitudinal rows of spirally arranged teeth 37. Said roller is provided with the end shafts 38 that are mounted in the bearing boxes 13. One of said shafts has a sprocket wheel 39 thereon that is connected to the sprocket wheel 22 by a chain 40.

A hood 41 is suspended from the frame 1 by the arms 42, said hood being over the roller 36 so that the mechanism of the harrow is protected from dirt and the like that may be thrown by the roller.

In Figs. 5 and 6 a skeleton roller has been shown that is formed of the end disks 43 which are connected by the angle iron bars 44, said bars being equipped with detachable teeth 45. End shafts 46 project from the disks 43 and are journaled in the boxes 13. One of said shafts 46 carries a gear wheel 47 that engages the teeth of gear ring 9. Cables 48 extend from the boxes 13 and pass over pulleys 49 carried by frame 1 and are wound on end pulleys 50 carried by a rocker shaft 51 journaled in the rear end of frame 1. A hand lever 52 is employed for operating said shaft so that the cables will raise the boxes 13 whereby the pulverizing roller is lifted from the ground. As will be obvious, before the roller can be raised, the handle levers 17 must be released from the latching plates 18. When the roller that is shown in Figs. 5 and 6 is employed, it will be clear that by raising said roller gear wheel 47 is disengaged from the gear ring 9, so that said roller is rendered idle. When the solid roller is employed, the same continues to revolve until the clutch sleeve 24 is released from hub 21.

An operator's seat 53 is carried by frame 1, said seat being located adjacent the hand lever 52 of the roller raising mechanism, and the hand lever 29 of the clutch mechanism, so that the operator can readily operate said levers without leaving the seat 53.

A chain tightening roller 54 is carried by a spring arm 55 depending from the rear of frame 1. Said arm holds the roller in contact with the sprocket chain 40 to keep said chain tight at all times.

What we claim as our invention is:—

1. A harrow comprising a frame, supporting wheels therefor, hanger bearings depending from said frame and provided with vertical guide slots, journal boxes slidable in said slots, guides carried by said bearings, rods projecting from said boxes and slidable through said guides, said rods provided with slots, hand levers projecting through said slots and pivotally connected to said bearings, latching plates for said levers, springs opposing movement of said rods in one direction, a pulverizing roller carried by said boxes, means for raising said boxes vertically, and means for operating said roller.

2. A harrow comprising a frame, supporting wheels therefor, a pulverizing roller carried by said frame, a hood for said roller, and arms depending from the front and rear of said frame and having upturned free ends for engaging the longitudinal edges of the hood.

In testimony whereof we hereunto affix our signatures in presence of two witnesses.

JOHN H. GLASSBURN.
WILLIAM C. EVANS.

Witnesses:
Roy Clements,
Evert B. Glassburn.

---

Copies of this patent may be obtained for five cents each, by addressing the "Commissioner of Patents, Washington, D. C."